United States Patent [19]

Clark

[11] Patent Number: 5,535,029
[45] Date of Patent: Jul. 9, 1996

[54] SPATIAL LIGHT MODULATOR HAVING AMPLITUDE COUPLED WITH BINARY PHASE MODE

[75] Inventor: Natalie Clark, Albuquerque, N.M.

[73] Assignee: The United States of America as represented by the Secretary of the Air Force, Washington, D.C.

[21] Appl. No.: 371,898

[22] Filed: Jan. 12, 1995

[51] Int. Cl.⁶ ............................ G02F 1/1335; G02F 1/135
[52] U.S. Cl. .................... 359/63; 359/72; 359/561
[58] Field of Search ................ 359/63, 72, 561; 348/761; 364/822

[56] References Cited

U.S. PATENT DOCUMENTS

| | | | |
|---|---|---|---|
| 4,609,256 | 9/1986 | Nakamura | 359/63 |
| 4,715,683 | 12/1987 | Gregory et al. | 359/63 |
| 5,024,508 | 6/1991 | Horner | 359/561 |
| 5,148,316 | 9/1992 | Horner et al. | 359/561 |
| 5,418,380 | 5/1995 | Simon et al. | 359/561 |

OTHER PUBLICATIONS

Horner et al., "Pattern Recognition with Binary Phase–Only Filters", Applied Optics, vol. 24, No. 5, 1 Mar. 1985, pp. 609–610.

Primary Examiner—Anita Pellman Gross
Assistant Examiner—Walter Malinowski
Attorney, Agent, or Firm—Robert L. Nathans; Stanton E. Collier

[57] ABSTRACT

An SLM rotates linearly polarized incident light, produced by a first polarizer, through a continuous range of angles up to a maximum angle, eg. seventy degrees. The second output polarizer is oriented orthogonally with respect to the angular thirty-five degrees bisector between the first polarization state at zero degrees rotation and the maximum possible angular rotation at seventy degrees and accordingly, a single SLM can be operated in an amplitude coupled binary phase mode.

20 Claims, 3 Drawing Sheets

| TABLE 1 | | |
|---|---|---|
| x | y | GRAY LEVEL |
| 0 | 0 | 128 |
| 1 | 0.707 | 40 |
| 2 | 1.000 | 0 |
| 3 | 0.707 | 40 |
| 4 | 0 | 128 |
| 5 | -0.707 | 213 |
| 6 | -1.000 | 255 |
| 7 | -0.707 | 213 |
| 8 | 0 | 128 |

$$\text{GRAY LEVEL} - \frac{255}{\theta_{MAX}} \left[ \frac{\theta_{MAX}}{2} \sin^{-1}\left( y \sin \frac{\theta_{MAX}}{2} \right) \right]$$

SPATIAL LIGHT MODULATOR HAVING AMPLITUDE COUPLED WITH BINARY PHASE MODE

STATEMENT OF GOVERNMENT INTEREST

The invention described herein may be manufactured and used by or for the Government for governmental purposes without the payment of any royalty thereon.

BACKGROUND OF THE INVENTION

The invention relates to the field of optical signal processing.

Amplitude encoded phase-only filters can be employed in Fourier transform optical correlators for determining whether a correlation exists between the Fourier transform of an input image and the transform of a reference image positioned within a spatial light modulator or filter at the Fourier transform plane. Such a correlation indicates a close match between the input image and the reference image. The present invention has been used in the classical VanderLugt filter at the Fourier transform plane and has several advantages over other methods such as the amplitude encoded phase-only filter for optical correlators disclosed in U.S. Pat. No. 5,024,508 to Horner and the averaged amplitude phase-only filter disclose in U.S. Pat. No. 5,148,316 to Horner and Flavin, both being incorporated by reference herein. First, the filter of the present invention is not restricted to positive values and thus no DC bias is required. Also, both the amplitude and binary phase of the filter can be economically implemented on a single spatial light modulator (SLM).

SUMMARY OF A PREFERRED EMBODIMENT OF THE INVENTION

In accordance with an embodiment of the invention, the aforesaid filter includes an SLM such as a liquid crystal TV (LCTV) which rotates the linearly polarized input light, produced by a first polarizer, through a continuous range of angles up to a maximum angle such as 70 degrees. As is known in the art, the degree of electric field rotation of the polarized light at each pixel can be controlled by a voltage from 0–255, applied to the electrode of each pixel. The second output polarizer is oriented orthogonally with respect to the angular bisector between the first polarization state (zero degrees rotation) and the maximum possible angular rotation. The result is that a single SLM can be operated in an amplitude coupled binary phase (ACBP) mode of the invention to yield the aforesaid advantages over the prior art amplitude encoded binary phase filters. Also, for uses aside from image correlators, any polarization-modulating SLM operating in the ACBP mode can be used as a real function generator taking on both positive and negative real values such as a sinusoidal function.

BRIEF DESCRIPTION OF THE DRAWINGS

Other features and advantages of the invention will become apparent upon study of the following description, taken in conjunction with the drawings in which.

DETAILED DESCRIPTION OF PREFERRED EMBODIMENTS OF THE INVENTION

Figure 1:
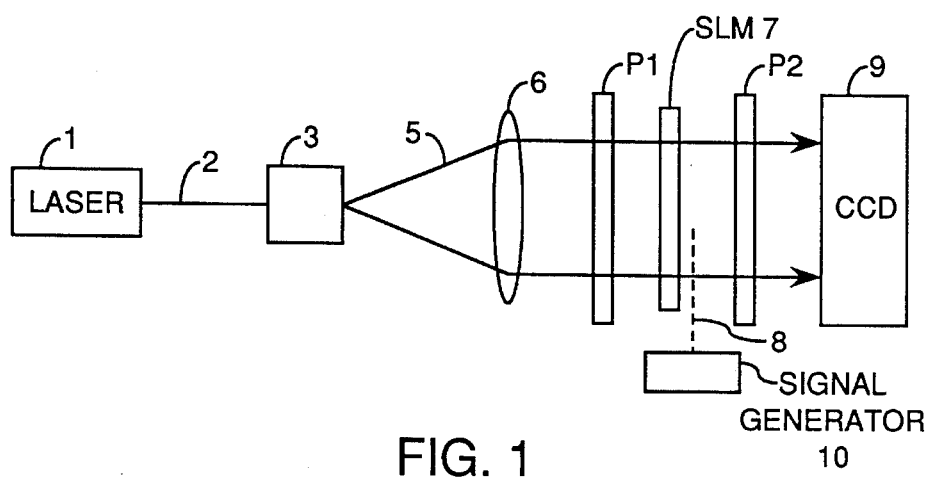
FIG. 1 illustrates an embodiment of the invention.

In FIG. 1, a laser 1 produces a coherent light beam 2 that is expanded by beam expander 3 to produce expanded beam 5 which illuminates a polarization-modulating SLM 7. The SLM is positioned between a first light input polarizer P1, which ensures that the input light is linearly polarized, and a second light output polarizer P2 optically coupled to CCD camera 9. SLM 7 can be a readily available and economical twisted nematic LCTV. The incident polarization will be aligned parallel or perpendicular with the director at the front surface of the device as is well known.

Figure 2:
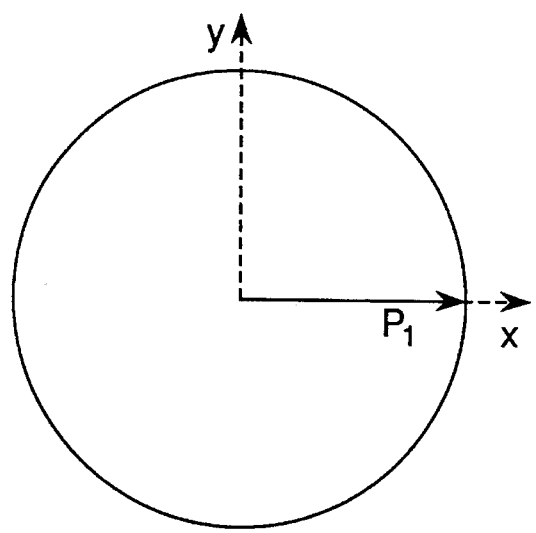
FIGS. 2–7 disclose polarization diagrams helpful in the understanding of the invention.
Figure 3:
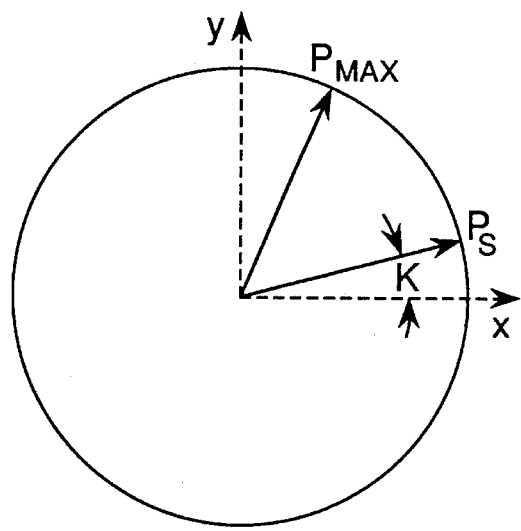
Figure 4:
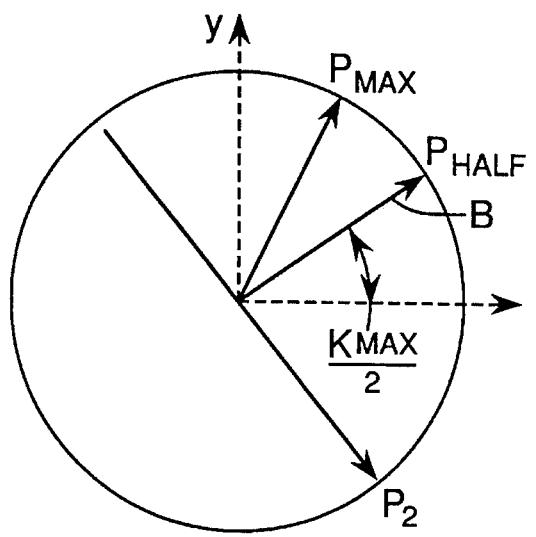
Figure 5:
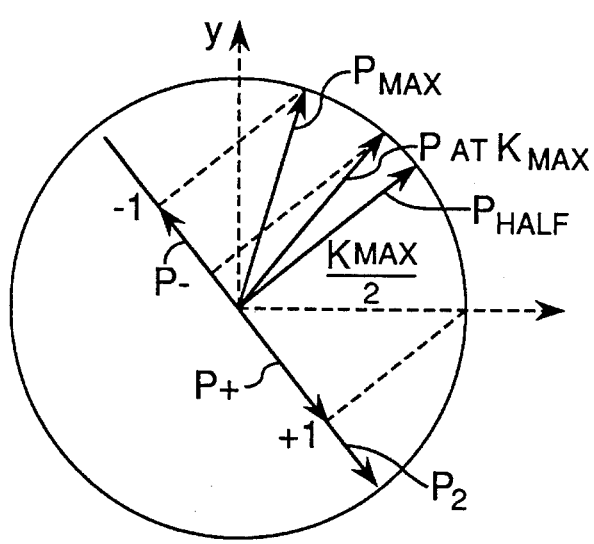

The polarization incident on the SLM can be assumed to be, for example, in the x position as shown in FIG. 2. The SLM can rotate the polarization to an angle k as shown in FIG. 3 that ranges from zero degrees to its maximum Kmax at Pmax. For the ACBP mode, the second polarizer P2 is oriented orthogonal to the angular bisector B as shown in FIG. 4. This orientation permits the SLM to take on positive values when it rotates the instant polarization zero to kmax/2 and takes on negative values when the rotation is greater than kmax/2. FIG. 5 illustrates this more clearly for an arbitrary polarization angle P. The second polarizer P2 only allows the portion of P in its direction to pass through; in this case it would take on a small negative value. The normalization to plus one and minus one was done for convenience.

Figure 6:
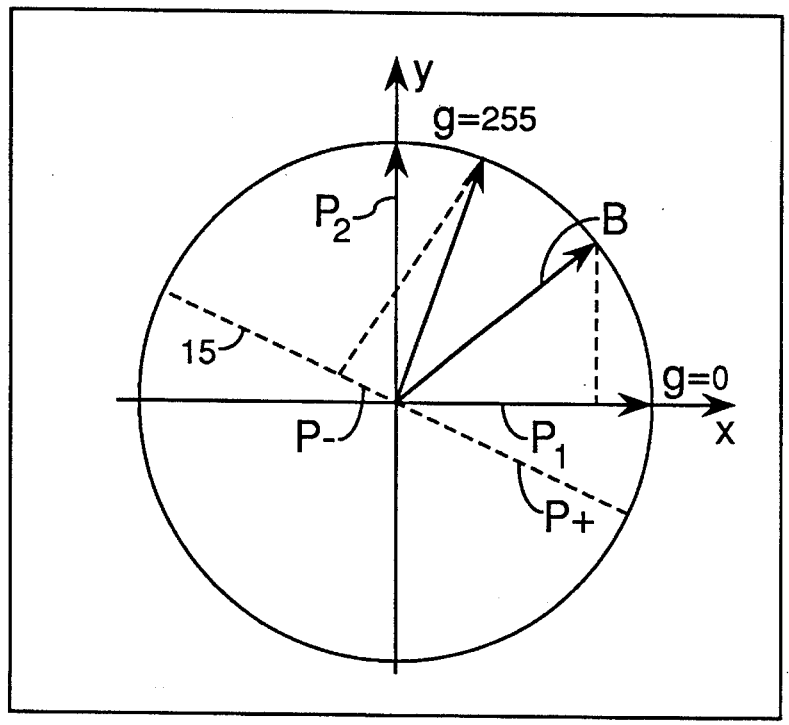

FIG. 6 illustrates the conventional amplitude mode for operating a polarization-modulating SLM, the second polarizer P2 being oriented orthogonally and thus at right angles relative to the orientation of the first polarizer P1. As indicated, in this mode SLM 7 can only take on positive values, in contrast with the ACBP mode of the present invention. As is explained below, the invention may be practised if P1 and P2 have a non-orthogonal relationship with respect to each other in contrast with FIG. 6. Binary phase-only filters can be implemented by SLMs such as magneto-optic SLMs (MOSLMs) which rotate the polarized light through fixed angles to establish the binary states. In the present invention, these two binary states are established by the direction of the projection of the polarized light along P2.

Figure 7:
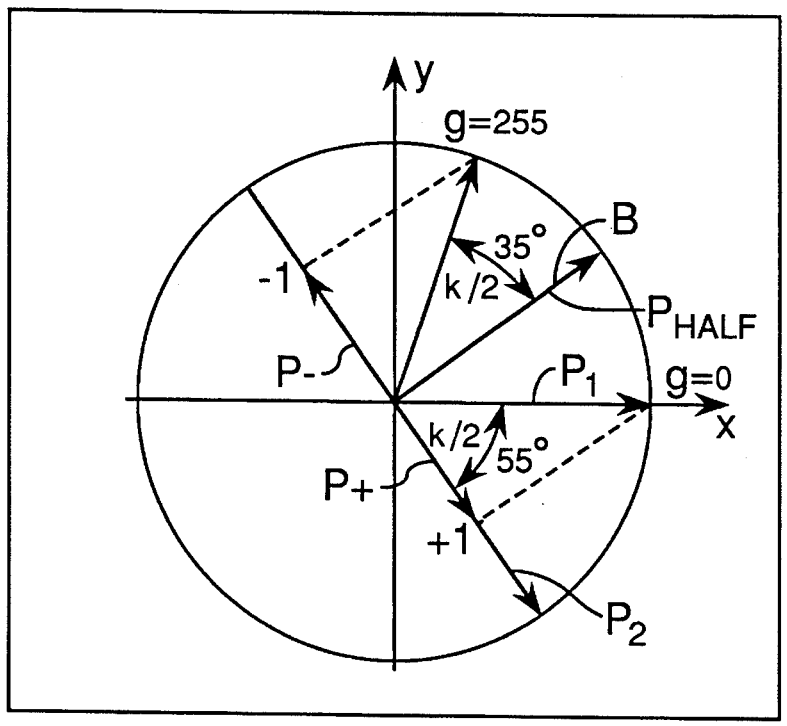

Referring now to FIGS. 5 and 7, note that for a gray level signal of zero (g=0), the projection p upon P2 will produce a high amplitude normalized plus one polarized signal p+ pointing downwardly, whereas a gray level of 255 (g=255) will produce a high amplitude normalized minus one projection −p along P2 which points upwardly, in the opposite sense of the downwardly pointing projection associated with the gray level of zero. Note the arrowheads along P2. The opposite directions of the projections represent two light beams having their amplitudes out of phase with each other by pi radians to create binary phase modulation. This will be readily understood by the skilled worker in the art who is familiar with the widely publicized Jones vector analysis methods for polarized light. See for example pages 344–346 of "Introduction to Classical and Modern Optics", by Meyer-Arendt, Prentice-Hall, 1984; and pages 268–271 of "Optics" Hecht Zajac, Addison-Wesley, 1974. However, in contrast with the binary phase-only filters mentioned in the previous paragraph, the LCTV SLM are also capable of continuously rotating the polarization of the incident light and thus the single LCTV can function in the ACBP mode of the present invention. This is because the amplitude portion of the signal is represented by the length of the projections from P upon P2 and the direction of such projections represents the binary phase of the signal. The polarizations varying between zero and 128 gray levels result in signals at associated pixels having positive transmittances as they point in the same direction as P2 whereas the polarizations between 128 and 255 at associated pixels result in signals having negative transmittances as they point in the opposite directions as P2. The amplitude portion of the signal associated with each pixel is determined by the magnitude of the projection of P upon P2. As indicated by FIG. 7, the output amplitudes at gray scale levels zero and 255 are the largest, whereas the amplitudes in the neighborhood of gray scale level 128 at Phalf are the smallest. While it is preferred that P2 be orthogonal to the angular bisector B to thus produce symmetry of positive and negative values along P2, the invention may be practised by causing P2 to merely form a non-orthogonal an angle with P1 other than ninety degrees such as represented by the dashed line 15 in FIG. 6. In this extreme case, the projections p– would be quite limited and few negative values would result. However, the directions of p– and p+ would still be opposite for at least a limited range of negative values at p– and hence the binary phase information would still be preserved.

A PC was used to control the voltages which produced an electronic replica of the reference image within an image processing board which in turn generated a standard video signal, g=0–255 that was sent to the Epson LCTV video projector via a standard cable. When the LCTV was placed between the aforesaid orthogonally oriented polarizers of FIG. 6, the optical output image in gray scale was observed. In the case of a frequency plane Fourier transform optical correlator, the LCTV would be positioned in the transform plane and the image therein would be the Fourier transform of the reference image to be compared with the transform of the input image, as mentioned previously in connection with the Horner patents which describe the operation of these correlators in detail.

The Epson LCTV that I used in my proof of concept prototype could continuously rotate light up to a maximum of k=70 degrees as shown in FIGS. 5 and 7 and the rotation was quite linear with respect to the continuously variable gray level voltage. For instance, when a computer gray level of zero is sent to a particular pixel, the incident light is not rotated. A gray level of 128 produced a rotation of k=35 degrees at Phalf and a gray level of 255 produced a maximum rotation of 70 degrees (35+35=70). Each particular pixel has an electrode associated therewith for applying the particular desired gray scale level voltage to produce the desired degree of rotation for that pixel. A conventional XY array of such light transparent electrodes is schematically represented by component 8 of FIG. 1, coupled to signal generator 10 containing the aforesaid PC electrical electrode control signal hardware components. In the ACBP mode, the second polarizer P2 was oriented 55 degrees with respect to the first polarizer P1 as shown in FIG. 7. The result was that P2 was orthogonal to the aforesaid angular bisector B, at kmax/2, which corresponds to "P half" shown in FIG. 7.

Thus, the SLM such as a LCTV can be used to take on all real values between −1 and +1. If a real value of y is desired, the gray level voltage to send it can be computed as $$\frac{255}{K_{MAX}} \left[ \frac{K_{MAX}}{2} \text{SIN}^{-1}\left( y\text{SIN} \frac{K_{MAX}}{2} \right) \right]$$

Figures 8, 9:
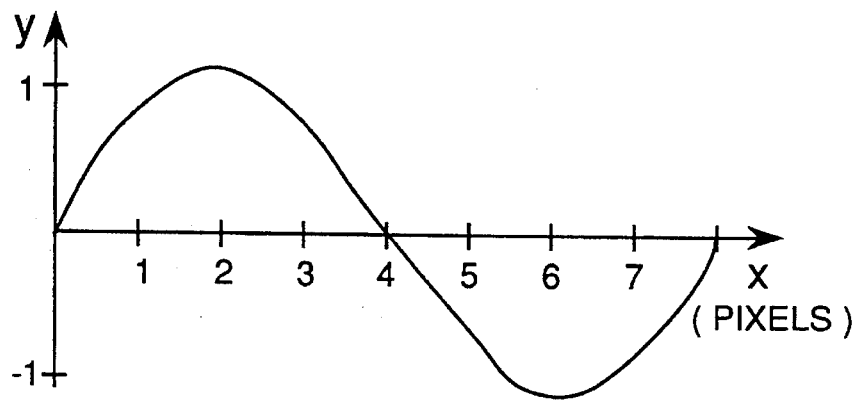
FIGS. 8 and 9 illustrate how the invention can be used as a function generator for generating a sinusoidal function within an SLM.

It should now be appreciated that any polarization modulating SLM operating in the ACBP mode can be used as a real function generator for various applications. For example, I encoded a sinusoidal function with a period of 8 pixels as indicated in FIG. 8. FIG. 9 shows the value of the sine x/8 function for each pixel along with the gray level sent to it in order to yield the desired value. The result is a programmable grating which produced a diffraction pattern operating in the ACBP mode and consisting of two equally bright point sources which were used in an optical signal processor built by me and described in my co-pending patent application entitled SPATIALLY MULTIPLEXED OPTICAL SIGNAL PROCESSOR, U.S. Ser. No. 08/369,037.

If the grating is operated in the amplitude mode, its diffraction grating consists of three point sources, two corresponding the sinusoidal function and the third due to the DC offset. I preferred using the ACBP mode in order to avoid always having a bright spot source at the origin. If I wanted more point sources, I encode the superposition of sinusoidal functions. For example, 0.5 sin(x/8)+0.5 sin(x/4) would yield four point sources.

Since other embodiments and applications of the invention will occur to the skilled worker in the art, the scope of the invention is to be measured in accordance with the terms of the following claims and art recognized equivalents thereof. For example, I employed the invention in connection with the design of a programmable lens, and a Hartmann dynamic wavefront sensor, which can be used in an adaptive optics system. Other applications include an ultrasensitive flow velocimeter, a dynamic aberration generator, and a real time reconfigurable cuer.

What is claimed is:

1. An optical signal processor comprising:
   (a) a polarization-modulating spatial light modulator (SLM) having an array of electrode means for controlling the degree of rotation of linearly polarized light passing through said SLM;
   (b) an electrical signal generator for applying variable amplitude electrical signals to said electrode means for varying the degree of rotation of polarized light passing through said SLM;
   (c) a first light input polarizer for directing linearly polarized light into said SLM;
   (d) a second light output polarizer non-orthogonally oriented with respect to said first polarizer for enabling operation of said SLM in an amplitude coupled with binary phase mode.

2. The processor of claim 1 wherein said SLM can rotate said polarized light passing through said SLM from zero degrees rotation up to a maximum angle and means for orienting said second light output polarizer orthogonally with respect to an angular bisector halfway between zero degrees and said maximum angle.

3. The processor of claim 2 wherein said electrical signal generator produces variable electrical signals for continuously rotating the polarization of light passing through said SLM.

4. The processor of claim 2 wherein said polarization-modulating SLM includes a liquid crystal television and wherein said second output polarizer is oriented at about fifty-five degrees with respect to said first input polarizer.

5. The processor of claim 1 wherein said second output polarizer is oriented orthogonally with respect to an angular bisector between a first polarization state of rotation and the maximum possible angular rotation.

6. The processor of claim 5 wherein said electrical signal generator produces variable electrical signals for continuously rotating the polarization of light passing through said SLM.

7. The processor of claim 1 wherein said electrical signal generator produces variable electrical signals for continuously rotating the polarization of light passing through said SLM.

8. The processor of claim 7 wherein said polarization-modulating SLM includes a liquid crystal television and wherein said second output polarizer is oriented at about fifty-five degrees with respect to said first input polarizer.

9. The processor of claim 1 wherein said polarization-modulating SLM includes a liquid crystal television and wherein said second output polarizer is oriented at about fifty-five degrees with respect to said first input polarizer.

10. An optical signal processor comprising:
   (a) a polarization-modulating spatial light modulator (SLM) having means for controlling the degree of rotation of linearly polarized light passing through said SLM;
   (b) means for directing input linearly polarized light having a given electrical vector into said SLM;
   (c) a light output polarizer non-orthogonally oriented with respect to the electrical vector of said input linearly polarized light for enabling operation of said SLM in an amplitude coupled with binary phase mode.

11. The processor of claim 10 wherein said SLM can rotate said polarized light passing through said SLM from zero degrees rotation up to a maximum angle and means for orienting said light output polarizer orthogonally with respect to an angular bisector halfway between zero degrees and said maximum angle.

12. The processor of claim 11 wherein said polarization-modulating SLM includes a liquid crystal television and wherein said light output polarizer is oriented at about fifty-five degrees with respect to the electrical vector of said input linearly polarized light.

13. The processor of claim 11 including means for continuously rotating the polarization of light passing through said SLM.

14. The processor of claim 13 wherein said polarization-modulating SLM includes a liquid crystal television and wherein said light output polarizer is oriented at about fifty-five degrees with respect to the electrical vector of said input linearly polarized light.

15. The processor of claim 10 wherein said light output polarizer is oriented orthogonally with respect to an angular bisector between a first polarization state of rotation and the maximum possible angular rotation.

16. The processor of claim 15 wherein said polarization-modulating SLM includes a liquid crystal television and wherein said light output polarizer is oriented at about fifty-five degrees with respect to the electrical vector of said input linearly polarized light.

17. The processor of claim 15 including means for continuously rotating the polarization of light passing through said SLM.

18. The processor of claim 10 including means for continuously rotating the polarization of light passing through said SLM.

19. The processor of claim 18 wherein said polarization-modulating SLM includes a liquid crystal television and wherein said light output polarizer is oriented at about fifty-five degrees with respect to the electrical vector of said input linearly polarized light.

20. The processor of claim 10 wherein said polarization-modulating SLM includes a liquid crystal television and wherein said light output polarizer is oriented at about fifty-five degrees with respect to the electrical vector of said input linearly polarized light.

* * * * *